Dec. 17, 1935.   A. C. ADAMS   2,024,137
BRAKE FOR MOTOR DRIVEN VEHICLES
Filed Sept. 27, 1933
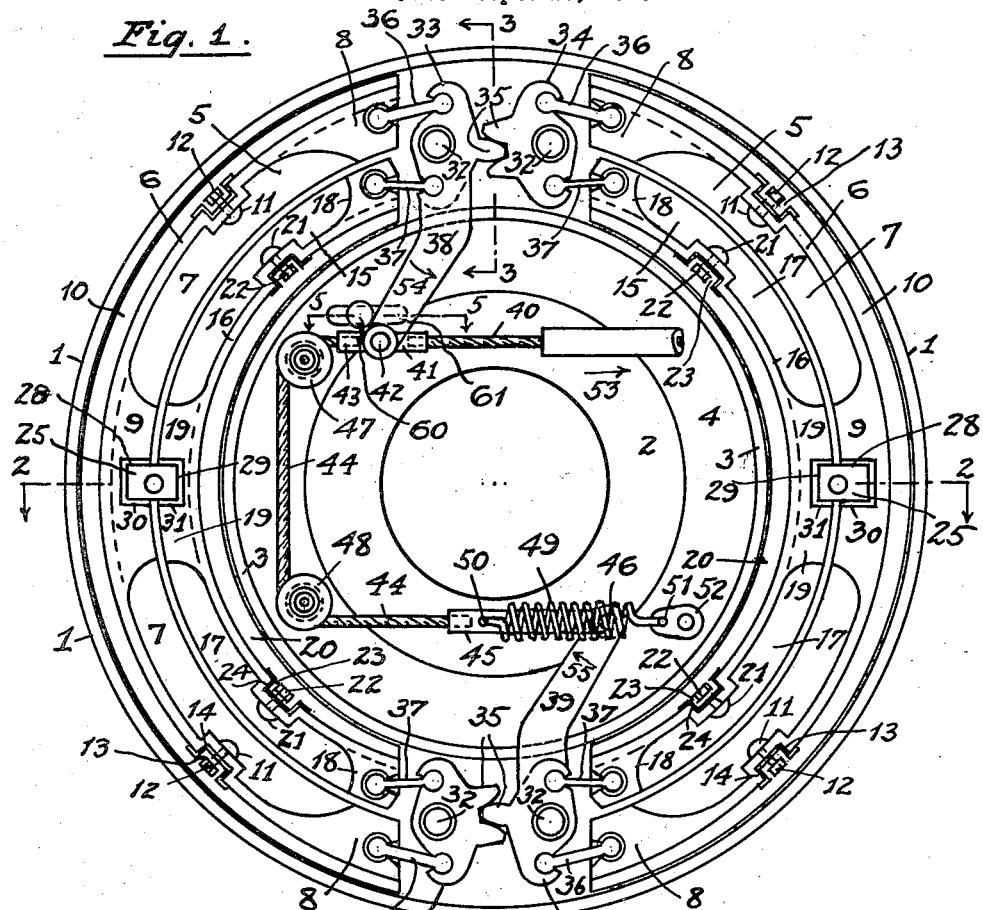
Fig. 1.
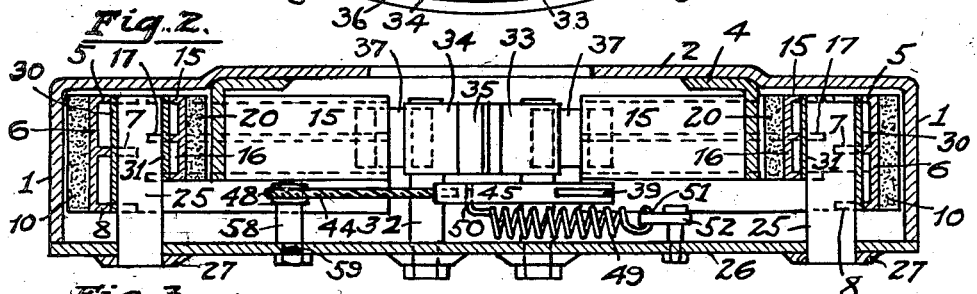
Fig. 2.
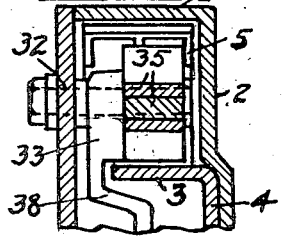
Fig. 3.
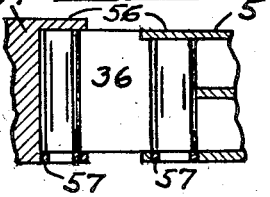
Fig. 4.
Fig. 5.
WITNESSES:—
William E. Simpson
D. J. Hyson
INVENTOR:—
Alfred C. Adams Patented Dec. 17, 1935

2,024,137

UNITED STATES PATENT OFFICE 2,024,137

BRAKE FOR MOTOR-DRIVEN VEHICLES

Alfred C. Adams, Detroit, Mich.

Application September 27, 1933, Serial No. 691,098

6 Claims. (Cl. 188—78)

My invention relates to brakes for motor-driven vehicles, and its principal object is to provide a brake for the purpose set forth which is capable of exerting a more powerful braking torque, having regard to its size, than is possible with such brakes as at present constructed.

Another object of my said invention is to provide a brake of the character referred to in which the frictional elements are brought into engagement throughout their entire periphery with the drum surfaces, so that they are capable of withstanding much higher working pressure without over-heating, and are also capable of being operated over long periods without the necessity of adjustment or repair.

A further object of my said invention is to provide a brake operating mechanism in which the internal forces are completely balanced and in which frictional losses are reduced to a minimum, so that a much more powerful braking effort is obtainable with less work on the part of the operator.

With these and other objects in view, the invention consists in the improved construction, arrangement, and combination of parts which will be hereinafter fully described, reference being had to the accompanying drawing, which illustrates a preferred embodiment thereof, in which drawing—

Figure 1 is an elevation of my improved mechanism with the stationary base plate or cover removed.

Figure 2 is a section on line 2—2 of Figure 1.

Figure 3 is a fragmentary section taken on line 3—3 of Figure 1, and

Figures 4 and 5 illustrate certain details to be described hereinafter.

Like characters designate corresponding parts throughout the several views.

1 is the main or outer drum, pressed from sheet metal, having the usual web 2 by which it is secured to the wheel of the the vehicle in any suitable manner well known in the art. 3 is the inner drum, also stamped from sheet metal, and having the radial flange 4 by which it is secured to the inner face of the web 2 by welding or other means.

In co-operative relation with the outer drum 1 are a pair of expanding brake shoes 5 of arcuate form, each of the said shoes consisting of a cylindrical flange 6 re-enforced by a central web 7 and provided with laterally disposed lugs 8, 9 at their ends and center, respectively, the whole being formed of sheet metal, preferably by stamping, or stamping and welding combined.

Upon the outer periphery of the shoes 5 are mounted the brake blocks 10, of molded asbestos or other material having a high friction coefficient, the said blocks being secured to the flanges 6 by screws 11 which pass therethrough and are screwed into nut members 12 which are imbedded in the blocks. The blocks 10 are also provided with transverse projections 13 which engage in recesses 14, thereby locking the parts securely against relative displacement in a rotary sense.

In co-operative relation with the inner drum 3 are a pair of contracting brake shoes 15 of arcuate form, each of the said shoes consisting of a cylindrical flange 16 re-enforced by a central web 17 and provided with laterally disposed lugs 18, 19 at their ends and center, respectively, the whole being formed preferably from sheet metal in a similar manner to that above described with regard to the expanding shoes 5.

Upon the inner periphery of the shoes 15 are mounted the brake blocks 20, also of molded asbestos or other material, the said blocks being secured to the flanges 16 by screws 21 which pass therethrough and are screwed into nut members 22 which are imbedded in the blocks. The blocks 20 are also provided with transverse projections 23 which engage in recesses 24, thereby locking the parts securely against relative displacement in a rotary sense.

At diametrically opposed points are the anchor members 25, the ends of which are secured in the stationary plate 26, the said plate being provided with re-inforcements 27 attached thereto by welding. These anchor members engage slidably in transverse slots 28, 29, formed in the central lugs 9, 19, respectively, of the inner and outer brake shoes, there being interposed liners 30, 31 adapted to take up wear between the parts and to provide a larger bearing surface.

Rigidly secured to the stationary plate 26 are the studs 32, and upon these studs are rotatably mounted rocker members 33, 34, arranged in pairs as shown in Figure 1, each pair being rotatably connected through the gear teeth 35. Each of the rocker members 33, 34 is connected at its outer end to the brake shoes 6 by the toggle links 36 and at its inner end to the brake shoes 15 by toggle links 37. Each of the links 36 consists of a relatively thick web member provided at its ends with parallel cylindrical heads adapted to engage in the corresponding transverse openings in the ends of the shoes 15 and in the rocker members 33, 34. Each of the toggle links 37 consists of a relatively thin web member provided at its ends with parallel cylindrical heads adapted to engage in corresponding transverse openings in the ends of the shoes 15 and in the rocker members 33, 34.

Upon the rocker members 33, and preferably integral therewith, are the operating levers 38, 39, the lever 38 being connected to the usual hook lever by means of the cable 40 and the yoke 41, the latter engaging a pin 42 in the lever. To the pin 42 is also connected a yoke 43 which is connected to the lever 39 by means of the steel wire cable 44 and yoke 45, the latter engaging a pin 46 in the lever. The cable 44 passes around a pair of sheaves 47, 48 and is kept taut by the helical tension spring 49, one end of which engages at 50 in the yoke 45 while the other end is anchored at 51 by means of the link 52.

It will be observed from the foregoing description and by reference to the drawing that when the cable 40 is pulled in the direction of the arrow 53 through the usual foot-operated mechanism, the levers 38, 39 will be moved in a direction indicated by the respective arrows 54, 55, and by this movement and consequent rotary movement of the rocker members 33, 34, the outer brake shoes 5 will be expanded and brought into frictional engagement with the outer drum 1, while at the same time the inner brake shoes 15 will be contracted and brought into frictional engagement with the inner brake drum 3, thereby producing simultaneously, four separate and distinct braking effects, which are at the same time in balanced relation as regards the internal forces. It will be observed that the toggle members 36 are under a compressive stress when in action, while the toggle members 37 are under tensional stress. It will be noted also that where the respective toggle links engage in the webs 7 and 17, and also in the lugs 8 and 18, bushings are provided so as to increase the wearing surface at these points. In order to retain the toggle links in place, the openings for their reception in the rocker members 33, 34 and in the ends of the shoes 5 and 15 are formed with one solid end, as indicated at 56 in Figure 4, the other end being open for the introduction of the toggles, after which introduction they are closed by means of the washers 57 which may be fiber, felt or other suitable material.

The brake blocks 10 and 20, as will be observed by reference to Figure 1, are made of considerably greater thickness at their middle than at their ends, by which construction the wear upon the blocks is equalized and the blocks themselves can be kept in continuous operation practically throughout their whole life without adjustment of any kind and, due to the distribution of the pressure throughout their whole peripheral surface and the consequent equality of wear of the material as well as of the dissipation of the heat resulting from the necessary friction, the life of the blocks will be many times that of those of the type at present employed.

In order to compensate for any stretch in the cable 44, the stud 58, upon which the sheave 48 is mounted, is formed with an eccentric portion 59, as shown more clearly in Figure 2, so that by rotating the said stud, the distance between the sheave 48 and its companion sheave 47 can be increased through a considerable range. Limitation of travel of the operating lever 38, so as to reduce lost motion of the mechanism to a minimum, is effected through the stop pin 60, shown in Figures 1 and 5, which is capable of being adjusted throughout the length of the slot 61 in the plate 26.

It will be understood from the foregoing that I have provided a brake which is of so powerful construction as to be capable of satisfactory operation under the heaviest loads, as well as under the most exacting conditions of service, without excessive heating and wear, and which may be operated over long periods without any attention or adjustment, and while I have herein described and shown a preferred embodiment of my invention, it will be readily understood by those skilled in the art that the same may be modified in various ways to meet any particular or peculiar requirement, without departing from the spirit of my invention. For example, while I have hitherto referred to my improved brake as comprising inner and outer brake shoes combined and arranged for simultaneous operation, I may, in cases where conditions require a brake of reduced power, employ either the outer or inner set of shoes and operating mechanism alone, so that the same component parts can be used for light or heavy vehicles and the cost of the said parts thereby greatly reduced, due to the increased volume of production.

Having thus described my said invention, what I claim and desire to secure by Letters Patent of the United States is:

1. A brake for motor-driven vehicles comprising concentric inner and outer drums having a space therebetween, a stationary anchor plate forming a closure for said space, a pair of diametrically opposed brake shoes slidably mounted upon said plate and adapted for frictional engagement with the internal periphery of said outer drum, a pair of similar shoes slidably mounted upon said plate and adapted for frictional engagement with the external periphery of said inner drum, pairs of rocker members pivotally mounted upon said plate and geared together for simultaneous movement in opposite directions, toggle links connecting said rocker members to the opposed ends of each pair of said shoes, and operating means connected to one of each pair of rocker members whereby both pairs of said shoes are simultaneously brought into frictional engagement with their respective drums throughout their periphery.

2. A brake for motor-driven vehicles comprising concentric inner and outer drums having a space therebetween, a stationary anchor plate forming a closure for said space, a pair of diametrically opposed brake shoes slidably mounted upon said plate and adapted for frictional engagement with the internal periphery of said outer drum, a pair of similar shoes slidably mounted upon said plate and adapted for frictional engagement with the external periphery of said inner drum, pairs of rocker members pivotally mounted upon said plate and geared together for simultaneous movement in opposite directions, toggle links connecting said rocker members to the opposed ends of each pair of said shoes, and operating means connected to one of each pair of rocker members whereby both pairs of said shoes are simultaneously brought into frictional engagement with their respective drums throughout their periphery, said operating means comprising lever arms upon said respective rocker members and a flexible member connecting said lever arms to a brake pedal and to each other.

3. A brake for motor-driven vehicles comprising concentric inner and outer drums having a space therebetween, a stationary anchor plate forming a closure for said space, a pair of diametrically opposed brake shoes slidably mounted upon said plate and adapted for frictional engagement with the internal periphery of said outer drum, a pair of similar shoes slidably mounted upon said plate and adapted for frictional engagement with the external periphery of said inner drum, pairs of rocker members pivotally mounted upon said plate and geared together for simultaneous movement in opposite directions, toggle links connecting said rocker members to the opposed ends of each pair of said shoes, and operating means connected to one of each pair of rocker members whereby both pairs of said shoes are simultaneously brought into firctional engagement with their respective drums throughout their periphery, said operating means comprising lever arms upon said respective rocker members, a flexible member connecting said lever arms to a brake pedal and to each other, and a pair of guide sheaves for said flexible member, one of said sheaves being eccentrically adjustable.

4. A brake for motor-driven vehicles comprising a drum, a stationary anchor plate, a pair of diametrically opposed brake shoes slidably mounted upon said plate and having their ends spaced apart, pairs of rocker members pivotally mounted upon said plate between adjacent ends of said shoes and geared together for simultaneous movement in opposite directions, flat toggle links having cylindrical heads engaging in complementary cylindrical openings in the adjacent faces of said brake shoes and said rocker members, and operating means connected to one of each pair of rocker members whereby both of said shoes are simultaneously brought into frictional engagement with said drum throughout their periphery.

5. A brake for motor-driven vehicles comprising a drum, a stationary anchor plate, a pair of diametrically opposed brake shoes slidably mounted upon said plate and having their ends spaced apart, each of said shoes consisting of a cylindrical flange re-enforced by a central web and provided with laterally disposed lugs at its ends, pairs of rocker members pivotally mounted upon said plate between adjacent ends of said shoes and geared together for simultaneous movement in opposite directions, toggle links having cylindrical heads engaging in complementary cylindrical openings in said rocker members and in transverse tubular bushings secured to the flanges and lugs in the ends of said shoes, and operating means connected to one of each pair of rocker members whereby both of said shoes are simultaneously brought into frictional engagement with said drum throughout their periphery.

6. A brake for motor-driven vehicles comprising a drum, a stationary anchor plate, a pair of diametrically opposed brake shoes slidably mounted upon said plate, pairs of rocker members pivotally mounted upon said plate and geared together for simultaneous movement in opposite directions, toggle links connecting said rocker members to the opposed ends of said shoes, operating means connected to one of each pair of rocker members whereby both of said shoes are simultaneously brought into frictional engagement with said drum throughout their periphery, arcuate friction elements upon said shoes having a greater thickness at their middle than at their ends, and means for securing said friction elements to said shoes comprising nuts embedded within said elements and screws passing through said shoes and engaging said nuts.

ALFRED C. ADAMS.